United States Patent
Aitken et al.

(10) Patent No.: US 11,223,933 B2
(45) Date of Patent: Jan. 11, 2022

(54) TELECOMMUNICATIONS NETWORK FOR VEHICLES

(71) Applicant: UATC, LLC, San Francisco, CA (US)

(72) Inventors: Michael James Aitken, Wexford, PA (US); Scott Smith, Pittsburgh, PA (US)

(73) Assignee: UATC, LLC, Mountain View, CA (US)

(*) Notice: Subject to any disclaimer, the term of this patent is extended or adjusted under 35 U.S.C. 154(b) by 197 days.

(21) Appl. No.: 15/883,715

(22) Filed: Jan. 30, 2018

(65) Prior Publication Data

US 2019/0222986 A1     Jul. 18, 2019

Related U.S. Application Data

(60) Provisional application No. 62/616,820, filed on Jan. 12, 2018.

(51) Int. Cl.
*H04W 4/46* (2018.01)
*H04W 12/06* (2021.01)
*G05D 1/02* (2020.01)
*H04L 29/06* (2006.01)
*G05D 1/00* (2006.01)

(52) U.S. Cl.
CPC .......... *H04W 4/46* (2018.02); *G05D 1/0285* (2013.01); *H04L 63/08* (2013.01); *H04W 12/06* (2013.01); *G05D 1/0088* (2013.01)

(58) Field of Classification Search
CPC .......... B29C 41/04; B32B 1/02; B32B 27/06; B32B 27/08; B65D 1/42

USPC .......................................... 370/328
See application file for complete search history.

(56) References Cited

U.S. PATENT DOCUMENTS

| | | | |
|---|---|---|---|
| 2006/0063549 A1* | 3/2006 | Choksi | G06Q 30/0225 455/518 |
| 2007/0038736 A1* | 2/2007 | Jorgensen | H04L 1/20 709/223 |
| 2010/0302974 A1* | 12/2010 | Niiyama | G07C 5/0808 370/254 |

(Continued)

*Primary Examiner* — Kibrom T Hailu
*Assistant Examiner* — Nizam U Ahmed
(74) *Attorney, Agent, or Firm* — Dority & Manning, P.A.

(57) ABSTRACT

Systems and methods for facilitating communication with autonomous vehicles are provided. In one example embodiment, the autonomous vehicle telecommunications network system includes a first point-of-presence (POP) interface configured to obtain a first communication associated with a first autonomous vehicle and to route the first communication associated with the first autonomous vehicle. The autonomous vehicle telecommunications network system includes a first security system configured to authenticate the first autonomous vehicle. The first POP interface is separate from the first security system. The autonomous vehicle telecommunications network system includes a first data center system configured to receive the first communication associated with the first autonomous vehicle that is authenticated and to provide data to the first autonomous vehicle. The first POP interface is separate from the first data center system. The autonomous vehicle telecommunications network system can include a similarly configured second POP interface, second security system, and second data center system.

12 Claims, 6 Drawing Sheets

(56) References Cited

U.S. PATENT DOCUMENTS

| | | | |
|---|---|---|---|
| 2014/0277917 A1* | 9/2014 | Banet | G07C 5/00 |
| | | | 701/31.5 |
| 2016/0071418 A1* | 3/2016 | Oshida | B60W 30/165 |
| | | | 701/23 |
| 2016/0226708 A1* | 8/2016 | Maheshwari | H04L 67/10 |
| 2017/0352200 A1* | 12/2017 | Wang | G08G 1/163 |

* cited by examiner

TELECOMMUNICATIONS NETWORK FOR VEHICLES

PRIORITY CLAIM

The present application is based on and claims priority to U.S. Provisional Application 62/616,820 having a filing date of Jan. 12, 2018, which is incorporated by reference herein.

FIELD

The present disclosure relates generally to improved telecommunications networks for communicating data to and/or from vehicles such as, for example, autonomous vehicles.

BACKGROUND

Vehicles can be configured to send and/or receive data from systems that are remote from the vehicles. For example, an autonomous vehicle can be capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment. Autonomous vehicles can send and/or receive data from remote systems to help with such operations.

SUMMARY

Aspects and advantages of embodiments of the present disclosure will be set forth in part in the following description, or may be learned from the description, or may be learned through practice of the embodiments.

One example aspect of the present disclosure is directed to an autonomous vehicle telecommunications network system. The autonomous vehicle telecommunications network system includes a first point-of-presence interface configured to obtain a first communication associated with a first autonomous vehicle and to route the first communication associated with the first autonomous vehicle. The autonomous vehicle telecommunications network system includes a first security system configured to authenticate the first autonomous vehicle. The autonomous vehicle telecommunications network system includes a first data center system configured to receive the first communication associated with the first autonomous vehicle that is authenticated and to provide data to the first autonomous vehicle. The autonomous vehicle telecommunications network system includes a second point-of-presence interface configured to obtain a second communication associated with a second autonomous vehicle and to route the second communication associated with the second autonomous vehicle. The autonomous vehicle telecommunications network system includes a second security system configured to authenticate the second autonomous vehicle. The autonomous vehicle telecommunications network system includes a second data center system configured to receive the second communication associated with the second autonomous vehicle that is authenticated and to provide data to the second autonomous vehicle.

Another example aspect of the present disclosure is directed to an autonomous vehicle telecommunications network system. The autonomous vehicle telecommunications network system includes a first point-of-presence interface configured to obtain a first communication associated with a first autonomous vehicle and to route the first communication associated with the first autonomous vehicle. The autonomous vehicle telecommunications network system includes a first security system configured to authenticate the first autonomous vehicle. The first point-of-presence interface is separate from the first security system. The autonomous vehicle telecommunications network system includes a first data center system configured to receive the first communication associated with the first autonomous vehicle that is authenticated and to provide data to the first autonomous vehicle. The first point-of-presence interface is separate from the first data center system.

Yet another example aspect of the present disclosure is directed to a computer-implemented method for facilitating communication with autonomous vehicles. The method includes obtaining, by a point-of-presence interface, a communication associated with an autonomous vehicle. The method includes determining, by the point-of presence interface, a recipient computing system based at least in part on the communication from the autonomous vehicle. The recipient computing system is separate from the point-of presence interface. The method includes facilitating, by the point-of-presence interface, an authentication of the autonomous vehicle by a security system. The point-of-presence interface is separate from the security system. The method includes providing, by the point-of-presence interface, the communication associated with the autonomous vehicle that is authenticated to the recipient computing system.

Other example aspects of the present disclosure are directed to systems, methods, vehicles, apparatuses, tangible, non-transitory computer-readable media, and memory devices for facilitating communication with autonomous vehicles.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
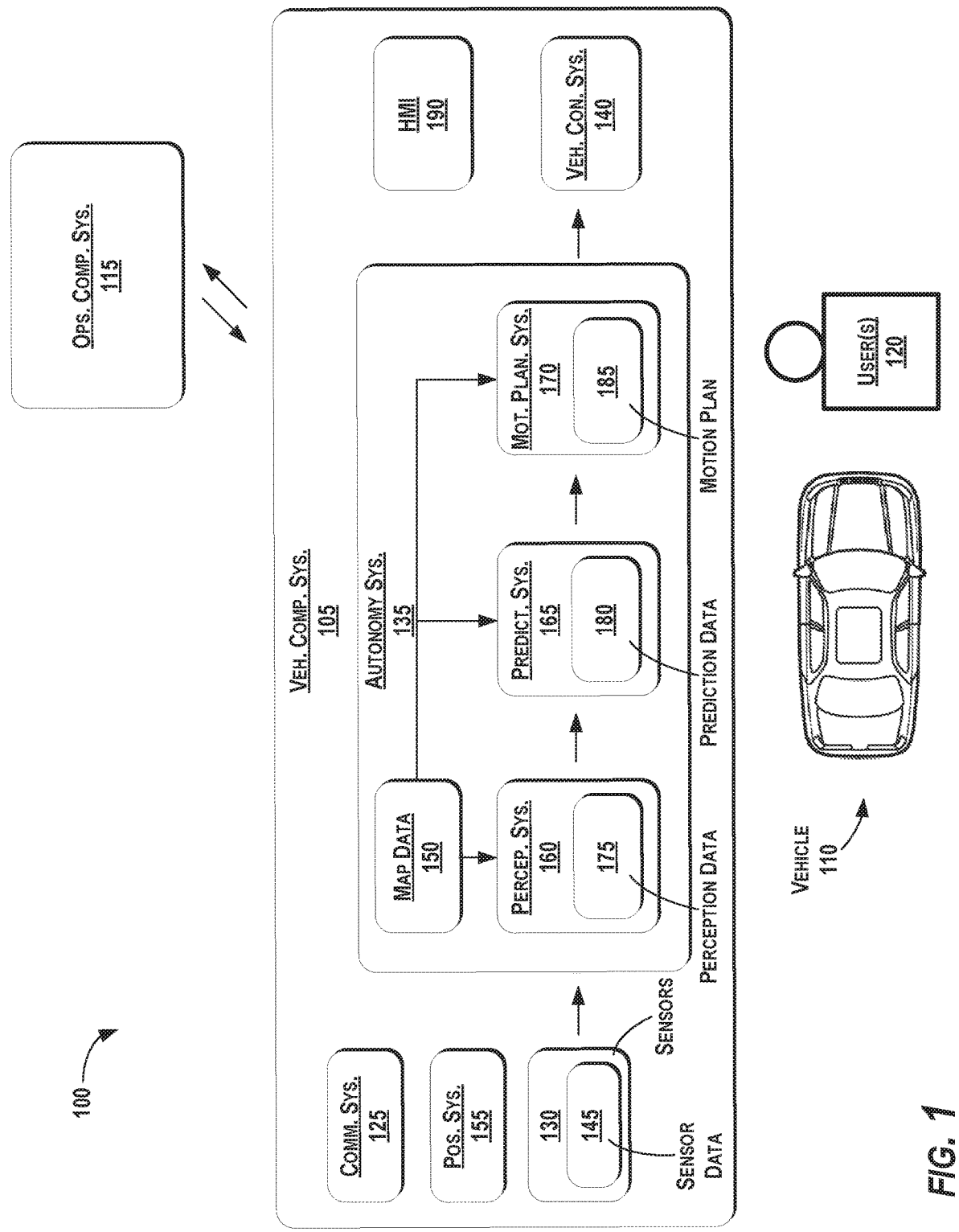
FIG. 1 depicts an example autonomous vehicle system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a telecommunications network for communicating data to and/or from autonomous vehicles. An autonomous vehicle can operate with minimal and/or no interaction from a human operator. To do so, an autonomous vehicle utilizes and generates a significant amount of data. For instance, the autonomous vehicle may rely on vehicle assignment data, map data, and/or other data from a remote data center to understand its current assignments (e.g., to transport a user from one place to another) as well as the geographic area in which it is travelling. Moreover, the autonomous vehicle can generate sensor data, perception data, and/or other data as the vehicle's sensors gather data associated with the vehicle's surroundings and the autonomous vehicle perceives the objects (e.g., other vehicles, pedestrians, etc.) within those surroundings. It can be beneficial to off-load such data to a remote data center to save memory resources and/or for additional analysis. Additionally, in certain circumstances, the autonomous vehicle may need to communicate with a remote vehicle assistance system to help address certain problems encountered by the vehicle (e.g., unexpected road conditions, user emergency, etc.).

Aspects of the present disclosure provide improved telecommunications network systems and methods for obtaining and providing such data from a vehicle such as, for example, an autonomous vehicle. The telecommunications network systems described herein can include standalone, regionally specific point-of-presence interfaces that serve to route the communications from a vehicle to a data center, a vehicle assistance system, and/or other systems that are separate and apart from the point-of-presence interfaces. For example, the telecommunications network system can include a first point-of-presence interface (e.g., associated with a west coast geographic region) and a second point-of-presence interface (e.g., associated with an east coast geographic region). Each point-of-presence interface can route communications to the systems associated with that particular region. Moreover, in the event one point-of-presence interface fails, communications from the vehicles of that region can be routed to the point-of presence interface of another region as a failsafe procedure. By utilizing standalone point-of-presence interfaces that are separate from the other network systems (e.g., security system, data center, etc.), the telecommunications network of the present disclosure can increase the security of the communications while decreasing the computational load on the point-of-presence interfaces. Additionally, by utilizing multiple, redundant, regionally specific point-of-presence interfaces the telecommunications network systems can provide a more reliable and scalable solution for transferring data to and/or from a fleet of vehicles.

The following describes the present disclosure with respect to autonomous vehicles. This is provided by example only. The aspects of the present disclosure are applicable to other vehicles such as, for example, non-autonomous vehicle. More particularly, an entity (e.g., service provider, owner, manager, etc.) can use autonomous vehicle(s) (e.g., ground-based vehicles) to provide a vehicle service such as a transportation service (e.g., rideshare service), a courier service, a delivery service, etc. to a plurality of users. An autonomous vehicle can operate with minimal and/or no interaction from a human operator. The autonomous vehicle can include an onboard vehicle computing system (e.g., located on or within the autonomous vehicle) that is configured to operate the vehicle. The vehicle computing system can receive sensor data from sensor(s) onboard the vehicle (e.g., cameras, LIDAR, RADAR, etc.), attempt to comprehend object(s) within the vehicle's surrounding environment by performing various processing techniques on the sensor data (e.g., creating perception data), predict the motion of such object(s) (e.g., creating prediction data), and generate an appropriate motion plan through the vehicle's surrounding environment. The autonomous vehicle can also obtain data, from one or more remote computing systems (e.g., of the entity) to help it autonomously operate within its surroundings. For example, the autonomous vehicle can be configured to communicate with one or more computing systems that are remote from the vehicle to obtain map data that helps the autonomous vehicle navigate within a particular geographic area. In some implementations, autonomous vehicles can directly communicate with one another.

An autonomous vehicle telecommunications network system according to example aspects of the present disclosure can provide an improved infrastructure to facilitate communication between an autonomous vehicle and various computing systems that are remote from the vehicle. The telecommunications network system can include one or more regional telecommunications systems. Each of the regional telecommunications systems can be associated with a different geographic region. By way of example, the telecommunications network system can include a first regional telecommunications system that is associated with the west coast of the United States and a second regional telecommunications system that is associated with the east coast of the United States. Each regional telecommunications system can include a point-of-presence interface, a security system, and a data center system. In some implementations, a regional telecommunications system can include an autonomous vehicle assistance system, as further described herein.

A point-of-presence interface can be configured to route the communications associated with an autonomous vehicle. A point-of-presence interface can include various computing devices (e.g., servers, routers, switches, multiplexers, other network interface equipment, etc.) for routing communications. For example, a point-of-presence interface can be a pass-through network that is simply configured for routing purposes. A point-of-presence interface can obtain communications from autonomous vehicle(s) via a plurality of different networks (e.g., various LTE wireless networks of different carriers, etc.). A point-of-presence interface can help facilitate the authentication of an autonomous vehicle by a security system that is configured for such authentication and other security functions (e.g., data encryption, proxy/load balancing, security termination, domain name system functions, network time protocol, and/or other functions) as well as routing the vehicle's communication(s) to the appropriate remote computing system (e.g., data center system, autonomous vehicle assistance system, etc.).

The point-of-presence interface(s) can be separate (e.g., physically, logically, etc.) from the other computing systems in the telecommunications network system. For instance, a point-of-presence interface can be implemented via different computing devices (e.g., different designated processors, etc.) and/or otherwise be separated from the security system, the data center system, the autonomous vehicle assistance system, etc. of its associated regional telecommunications system. In this way, a point-of-presence interface does not need to perform any security functions and/or store (at least not in the long term) any proprietary data (e.g., source code, proprietary vehicle data, etc.). Such functions and information can instead be kept more securely in the separate security and data center systems. This also allows a point-of-presence interface to avoid the use of internet protocol security (IPSEC) while the security system (and a vehicle API) provide more scalable and futureproof security solutions for the telecommunications network, as further described herein. Moreover, this can allow the computational resources of a point-of-presence interface to be allocated to its more core routing functionality.

The point-of-presence interface(s) can also provide a failover process for the telecommunications network system. As described herein, the telecommunications network system can include multiple point-of-presence interfaces (e.g., each associated with a particular geographic region). By way of example, the telecommunications network system can include a first point-of-presence interface (e.g., associated with a first geographic region) and a second point-of-presence interface (e.g., associated with a second geographic region). The first point-of-presence interface can be configured to obtain communications from autonomous vehicle(s) located within the first geographic region and the second point-of-presence interface can be configured to obtain communications from autonomous vehicle(s) located within the second geographic region (e.g., to help decrease latency caused by long distance data traffic). In the event that the first point-of-presence interface is unavailable (e.g., due to hardware/software failure, unreachable due to communication error, etc.), the second point-of-presence interface can obtain and/or provide communications associated with the autonomous vehicle(s) located within the first geographic region, and vice versa. This can ensure that, for example, the data utilized for vehicle operation (e.g., map data), data generated by the vehicle (e.g., sensor data), as well other communications (e.g., distress calls) are still appropriately addressed in the event of a system failure.

The point-of-presence interface(s) can facilitate the authentication of the autonomous vehicle by a security system. As described herein, each regional telecommunications system can include a security system that is separate from the respective point-of-presence interface. A security system can include various systems and devices for authenticating an autonomous vehicle. For instance, a security system can include a key server, a vehicle domain name system (DNS) server (e.g., secure DNS server), and/or other computing device(s), which can authenticate an autonomous vehicle to communicate with the other systems of the telecommunications network. By way of example, a unique identifier, token, etc. can be stored onboard an autonomous vehicle and can be provided to the security system so that the security system can identify that the autonomous vehicle is part of an associated fleet and/or otherwise an authorized vehicle. As a result of a handshake process, the autonomous vehicle can obtain a key that can allow the autonomous vehicle to be authenticated for calling a vehicle application programming interface (API) gateway of the data center system. The vehicle API gateway and the vehicle can undergo a handshake procedure to determine one or more temporary keys to be used for that particular API session. The API session can allow the autonomous vehicle to send and receive data from a remote computing system such as, for example, a data center system.

A data center system, which is also separate from the point-of-presence interface(s), can be configured to obtain communications associated with an autonomous vehicle and/or provide data to an autonomous vehicle. The data center system can include the vehicle API gateway which can allow the autonomous vehicle to create API sessions for communication with the data center system. In some implementations, the autonomous vehicle can request data from the data center system (e.g., via an API session). For example, the data center system can be configured to provide the autonomous vehicle with map data (e.g., associated with an area in which the vehicle is and/or will be travelling), vehicle service data (e.g., data associated with a transportation service, delivery service, courier service, etc. to be provided by the vehicle), maintenance data (e.g., indicative of when and where the vehicle is to receive maintenance), and/or other information. In some implementations, the autonomous vehicle may request such data from the data center system on an as-needed basis. In some implementations, the data center system can provide data to the autonomous vehicle without the autonomous vehicle requesting such data (e.g., periodically providing updated map data). In some implementations, the autonomous vehicle can upload data to the data center system. For example, the data center system can obtain sensor data, perception data, prediction data, motion planning data, and/or other data generated onboard the autonomous vehicle. Such data can be stored in the data center system and/or transmitted to another system for storage and/or further analysis.

The autonomous vehicle telecommunications network can also include an autonomous vehicle assistance system configured to provide assistance to an autonomous vehicle. For instance, an autonomous vehicle can provide a communication requesting assistance from the autonomous vehicle assistance system. A point-of-presence interface can recognize this type of communication and can route the communication to the autonomous vehicle assistance system. Data traffic to (and/or from) the autonomous vehicle assistance system (and the human operators associated therewith) can be routed directly via the point-of-presence interface, as described herein, and/or through the respective data center system. In some implementations, the autonomous vehicle can first be authenticated by the security system before communicating with the autonomous vehicle assistance system. In response to the communication requesting assistance, the autonomous vehicle assistance system can communicate with the autonomous vehicle to address the issue faced by the vehicle.

By way of example, the autonomous vehicle may encounter a travel way that is unexpectedly blocked by an obstruction (e.g., due to a fallen tree, etc.). The autonomous vehicle may not have a high enough confidence level to autonomously navigate the obstruction. Thus, the autonomous vehicle can send (e.g., via its onboard communication system) a communication requesting assistance from the autonomous vehicle assistance system. The point-of-presence interface act as an interface for the security system to authenticate an autonomous vehicle (e.g., by passing keys, etc.). Once authenticated, the autonomous vehicle assistance system can communicate with the autonomous vehicle (e.g., in at least near real-time) to allow a human operator (e.g., that is remote from the vehicle) to manually control the autonomous vehicle to traverse the obstruction.

In some implementations, a user of an autonomous vehicle can initiate a communication from the autonomous vehicle to the autonomous vehicle assistance system. By way of example, a user of the autonomous vehicle (e.g., a rider of the vehicle for a transportation service) may discover an issue with the autonomous vehicle (e.g., broken equipment in the vehicle cabin) and/or the user may experience a problem (e.g., a medical issue). The user can provide user input to a human-machine interface (e.g., tablet, etc.) located within the autonomous vehicle to request assistance from the autonomous vehicle assistance system. In response, the autonomous vehicle can provide a communication requesting such assistance to the point-of-presence interface which can route the communication for authentication and delivery to the autonomous vehicle assistance system accordingly, as described herein. The autonomous vehicle assistance system can communicate with the autonomous vehicle to address the issue. For example, a human operator associated with the autonomous vehicle assistance system can participate in a video conference with the user of the autonomous vehicle via the onboard human-machine interface. This can allow the human operator to comfort the user as well as work to address the issue discovered by and/or experienced by the user.

In some implementations, the autonomous vehicle assistance system can be configured to proactively monitor and/or check the status of an autonomous vehicle and/or its user. For example, the autonomous vehicle assistance system can provide data to the autonomous vehicle requesting the status of vehicle equipment (e.g., the current tire pressure, etc.). In response, the autonomous vehicle can provide, via the telecommunications network system, a communication to the autonomous vehicle assistance system that indicates the equipment's status (e.g., the tire pressure of the vehicle's tires). In another example, the autonomous vehicle assistance system can provide data to a human-machine interface (e.g., an onboard tablet, etc.) that asks a user whether the user is comfortable (e.g., warm enough, cool enough, etc.). The user can provide user input (e.g., via a user interface displayed on a display device of the human-machine interface, a microphone, etc.) indicating the user's comfort status and a communication indicative of such user input can be provided to the autonomous vehicle assistance system (via the telecommunications network system).

In some implementations, the autonomous vehicle telecommunications network system can provide the autonomous vehicle with access to a public network, such as a public internet network. Connectivity from the autonomous vehicle to the public network can either be direct (e.g., routed via the point-of-presence interface) and/or controlled by looping public network traffic through vehicle API administered networks within the respective data center systems.

Use of a public network can allow the user of an autonomous vehicle to utilize a variety of third party services. For instance, the human-machine interface (e.g., tablet, gaming system, etc.) onboard the autonomous vehicle can allow a user to utilize various software applications (e.g., while riding in the vehicle for a transportation service). The software applications can utilize a public network to provide the various third party services to the user. For example, the human-machine interface may allow a user to utilize a video streaming service. In the event that a software application associated with the video streaming service is launched (e.g., upon user selection), the autonomous vehicle can send a communication to the point-of-presence interface to allow the onboard human-machine interface to access a public internet network so that the user can stream visual content (e.g., movies, TV shows, etc.) while in the autonomous vehicle. In another example, when a gaming software application is launched, the autonomous vehicle can access the public internet via the point-of-presence interface to allow the user to play a game on the internet (e.g., with users of other autonomous vehicles).

In some implementations, the autonomous vehicles may utilize one or more subscriber identity modules (SIMs) to backhaul data traffic to a point-of-presence interface that is directed a private network and/or for data traffic to public network. For example, an autonomous vehicle can include one or more SIMs (e.g., a private SIM) which backhaul traffic into a point-of-presence interface, and one or more other SIMs (e.g., a public internet SIM) which is for data traffic to be provided directly onto a public network via a telecommunications networks (e.g., a cellular carrier network).

The systems and methods described herein provide a number of technical effects and benefits. For instance, the present disclosure can provide a plurality of redundant regional telecommunications systems that can help decrease transmission latency, while offering better reliability and scalability. For example, the telecommunications network system can provide a point-of-presence interface, a security system, a data center system, etc. that are available for the autonomous vehicles within an associated geographic region. This can allow the data traffic associated with such autonomous vehicles to be routed to a geographically proximate system, thereby reducing the latency that may be caused by long distance data routing. Moreover, in the event of a failure event (e.g., point-of-presence interface failure, security system downtime, data center downtime, etc.), the data traffic from autonomous vehicles in one region can be routed to another regional telecommunications system. In this way, the multiple regional telecommunications systems of the present disclosure can provide a more dependable failover response in the event of regional system failure. This can help ensure that autonomous vehicle issues are addressed, leading to less vehicle downtime and less user dissatisfaction.

Aspects of the present disclosure also provide a more scalable telecommunications solution. For example, additional regional telecommunications systems can be added to the overall network as more regions begin to implement the use of autonomous vehicles. By having separate regional systems, the regional telecommunications system of one region can be unaffected as a new regional system is added to the network. This can allow for better long term scalability, with less system downtime.

The systems and methods of the present disclosure also provide an improvement to vehicle computing technology, such as autonomous vehicle telecommunications network computing technology. For instance, the systems and methods provide a more secure telecommunications network for transmitting data to and/or from an autonomous vehicle. For example, under the present disclosure an example telecommunications network system can include a first point-of-presence interface configured to obtain a first communication associated with a first autonomous vehicle and to route the first communication associated with the first autonomous vehicle. The telecommunications network system can include a first security system configured to authenticate the first autonomous vehicle. The first point-of-presence interface can be separate from the first security system. The telecommunications network system can also include a first data center system configured to receive the first communication associated with the authenticated first autonomous vehicle and to provide data to the first autonomous vehicle. The first point-of-presence interface can be separate from the first data center system. The telecommunications network system can include a similar second point-of-presence interface, second security system, second data center, etc. that is associated with another geographic region than the first system components. By separating (e.g., logically, physically, etc.) a point-of-presence interface from the security system and the data center system, the telecommunications network system of the present disclosure can provide a more secure telecommunications solution that operates with less overhead. For instance, this can allow the point-of-presence system to be implemented as a pass-through network that focuses its computational resources on routing, rather than security functions. This leads to better allocation of the computational resources of the point-of-presence interface(s). Moreover, the present disclosure allows for the avoidance of IPSEC tunnels, instead allowing the vehicle API in a data center system to encapsulate the data traffic, and have sessions that terminate directly in the data center system on a highly reliable vehicle API gateway. This helps further decrease system overhead and allows for a more futureproof and scalable solution to autonomous vehicle data security. Moreover, this can be advantageous as the vehicle API is well positioned to channelize, prioritize, stream, decimate, etc. data traffic from various sources onboard the autonomous vehicles.

With reference now to the FIGS., example embodiments of the present disclosure will be discussed in further detail. FIG. 1 illustrates an example system 100 according to example embodiments of the present disclosure. The system 100 can include a vehicle computing system 105 associated with a vehicle 110. The system 100 can include an operations computing system 115 that is remote from the vehicle 110.

In some implementations, the vehicle 110 can be associated with an entity (e.g., a service provider, owner, manager). The entity can be one that offers one or more vehicle service(s) to a plurality of users via a fleet of vehicles that includes, for example, the vehicle 110. In some implementations, the entity can be associated with only vehicle 110 (e.g., a sole owner, manager). In some implementations, the operations computing system 115 can be associated with the entity. The vehicle 110 can be configured to provide one or more vehicle services to one or more users 120. The vehicle service(s) can include transportation services (e.g., rideshare services in which user rides in the vehicle 110 to be transported), courier services, delivery services, and/or other types of services. The vehicle service(s) can be offered to the users 120 by the entity, for example, via a software application (e.g., a mobile phone software application). The entity can utilize the operations computing system 115 to coordinate and/or manage the vehicle 110 (and its associated fleet, if any) to provide the vehicle services to a user 120.

The operations computing system 115 can include one or more computing devices that are remote from the vehicle 110 (e.g., located off-board the vehicle 110). For example, such computing device(s) can be components of a cloud-based server system and/or other type of computing system that can communicate with the vehicle computing system 105 of the vehicle 110 (and/or a user device). The operations computing system 115 can be implemented with an infrastructure (e.g., of the entity), as further described herein. The computing device(s) of the operations computing system 115 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system 115 (e.g., the one or more processors, etc.) to perform operations and functions, such as providing data to and/or obtaining data from the vehicle 110, for managing a fleet of vehicles (that includes the vehicle 110), etc.

The vehicle 110 incorporating the vehicle computing system 105 can be various types of vehicles. For instance, in some implementations, the vehicle 110 can be a non-autonomous vehicle (e.g., ground-based, air-based, water-based, other vehicles, etc.). For instance, the vehicle 110 can be a ground-based autonomous vehicle such as an autonomous car, autonomous truck, autonomous bus, etc. The vehicle 110 can be an air-based autonomous vehicle (e.g., airplane, helicopter, or other aircraft) or other types of vehicles (e.g., watercraft, etc.). The vehicle 110 can be an autonomous vehicle that can drive, navigate, operate, etc. with minimal and/or no interaction from a human operator (e.g., driver). In some implementations, a human operator can be omitted from the vehicle 110 (and/or also omitted from remote control of the vehicle 110). In some implementations, a human operator can be included in the vehicle 110.

In some implementations, the vehicle 110 can be configured to operate in a plurality of operating modes. The vehicle 110 can be configured to operate in a fully autonomous (e.g., self-driving) operating mode in which the vehicle 110 is controllable without user input (e.g., can drive and navigate with no input from a human operator present in the vehicle 110 and/or remote from the vehicle 110). The vehicle 110 can operate in a semi-autonomous operating mode in which the vehicle 110 can operate with some input from a human operator present in the vehicle 110 (and/or a human operator that is remote from the vehicle 110). The vehicle 110 can enter into a manual operating mode in which the vehicle 110 is fully controllable by a human operator (e.g., human driver, pilot, etc.) and can be prohibited and/or disabled (e.g., temporary, permanently, etc.) from performing autonomous navigation (e.g., autonomous driving). In some implementations, the vehicle 110 can implement vehicle operating assistance technology (e.g., collision mitigation system, power assist steering, etc.) while in the manual operating mode to help assist the human operator of the vehicle 110.

The operating modes of the vehicle 110 can be stored in a memory onboard the vehicle 110. For example, the operating modes can be defined by an operating mode data structure (e.g., rule, list, table, etc.) that indicates one or more operating parameters for the vehicle 110, while in the particular operating mode. For example, an operating mode data structure can indicate that the vehicle 110 is to autonomously plan its motion when in the fully autonomous operating mode. The vehicle computing system 105 can access the memory when implementing an operating mode.

The operating mode of the vehicle 110 can be adjusted in a variety of manners. In some implementations, the operating mode of the vehicle 110 can be selected remotely, off-board the vehicle 110. For example, an entity associated with the vehicle 110 (e.g., a service provider) can utilize the operations computing system 115 to manage the vehicle 110 (and/or an associated fleet). The operations computing system 115 can send data to the vehicle 110 instructing the vehicle 110 to enter into, exit from, maintain, etc. an operating mode. By way of example, the operations computing system 115 can send data to the vehicle 110 instructing the vehicle 110 to enter into the fully autonomous operating mode. In some implementations, the operating mode of the vehicle 110 can be set onboard and/or near the vehicle 110. For example, the vehicle computing system 105 can automatically determine when and where the vehicle 110 is to enter, change, maintain, etc. a particular operating mode (e.g., without user input). Additionally, or alternatively, the operating mode of the vehicle 110 can be manually selected via one or more interfaces located onboard the vehicle 110 (e.g., key switch, button, etc.) and/or associated with a computing device proximate to the vehicle 110 (e.g., a tablet operated by authorized personnel located near the vehicle 110). In some implementations, the operating mode of the vehicle 110 can be adjusted by manipulating a series of interfaces in a particular order to cause the vehicle 110 to enter into a particular operating mode.

The vehicle computing system 105 can include one or more computing devices located onboard the vehicle 110. For example, the computing device(s) can be located on and/or within the vehicle 110. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 110 (e.g., its computing system, one or more processors, etc.) to perform operations and functions, such as those described herein for determining object motion, controlling vehicle motion, etc.

The vehicle 110 can include a communications system 125 configured to allow the vehicle computing system 105 (and its computing device(s)) to communicate with other computing devices. The vehicle computing system 105 can use the communications system 125 to communicate with the operations computing system 115 and/or one or more other computing device(s) over one or more networks (e.g., via one or more wireless signal connections). For example, the vehicle computing system 105 can utilize the communications system to communicate with one or more system clients that are remote from the vehicle 110 via a telecommunications network system, as further described herein. In some implementations, the communications system 125 can allow communication among one or more of the system(s) on-board the vehicle 110. The communications system 125 can include any suitable components for interfacing with one or more network(s), including, for example, transmitters, receivers, ports, controllers, antennas, and/or other suitable components that can help facilitate communication.

As shown in FIG. 1, the vehicle 110 can include one or more vehicle sensors 130, an autonomy computing system 135, one or more vehicle control systems 140, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 130 can be configured to acquire sensor data 145 associated with one or more objects that are within the surrounding environment of the vehicle 110. For instance, the sensor data 145 can be acquired for object(s) that are within a field of view of one or more of the vehicle sensor(s) 130. The vehicle sensor(s) 130 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 145 can include image data, radar data, LIDAR data, and/or other data acquired by the vehicle sensor(s) 130. The object(s) can include, for example, vehicles, pedestrians, bicycles, and/or other objects. The object(s) can be located in front of, to the rear of, to the side of the vehicle 110, etc. The sensor data 145 can be indicative of locations associated with the object(s) within the surrounding environment of the vehicle 110 at one or more times. The vehicle sensor(s) 130 can provide the sensor data 145 to the autonomy computing system 135.

In addition to the sensor data 145, the autonomy computing system 135 can retrieve or otherwise obtain map data 150. The map data 150 can provide detailed information about the surrounding environment of the vehicle 110. For example, the map data 150 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 110 in comprehending and perceiving its surrounding environment and its relationship thereto. In some implementations, the vehicle computing system 105 can determine a vehicle route for the vehicle 110 based at least in part on the map data 150.

The vehicle 110 can include a positioning system 155. The positioning system 155 can determine a current position of the vehicle 110. The positioning system 155 can be any device or circuitry for analyzing the position of the vehicle 110. For example, the positioning system 155 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 110 can be used by various systems of the vehicle computing system 105 and/or provided to a remote computing device (e.g., of the operations computing system 115). For example, the map data 150 can provide the vehicle 110 relative positions of the surrounding environment of the vehicle 104. The vehicle 110 can identify its position within the surrounding environment (e.g., across six axes) based at least in part on the data described herein. For example, the vehicle 110 can process the vehicle sensor data 145 (e.g., LIDAR data, camera data) to match it to a map of the surrounding environment to get an understanding of the vehicle's position within that environment.

The autonomy computing system 135 can include a perception system 160, a prediction system 165, a motion planning system 170, and/or other systems that cooperate to perceive the surrounding environment of the vehicle 110 and determine a motion plan for controlling the motion of the vehicle 110 accordingly. For example, the autonomy computing system 135 can obtain the sensor data 145 from the vehicle sensor(s) 130, attempt to comprehend the surrounding environment by performing various processing techniques on the sensor data 145 (and/or other data), and generate an appropriate motion plan through such surrounding environment. The autonomy computing system 135 can control the one or more vehicle control systems 140 to operate the vehicle 110 according to the motion plan.

The vehicle computing system 105 (e.g., the autonomy system 135) can identify one or more objects that are proximate to the vehicle 110 based at least in part on the sensor data 130 and/or the map data 150. For example, the vehicle computing system 105 (e.g., the perception system 160) can process the sensor data 145, the map data 150, etc. to obtain perception data 175. The vehicle computing system 105 can generate perception data 175 that is indicative of one or more states (e.g., current and/or past state(s)) of a plurality of objects that are within a surrounding environment of the vehicle 110. For example, the perception data 175 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 160 can provide the perception data 175 to the prediction system 165 (and/or the motion planning system 170).

The prediction system 165 can be configured to predict a motion of the object(s) within the surrounding environment of the vehicle 110. For instance, the prediction system 165 can generate prediction data 180 associated with such object(s). The prediction data 180 can be indicative of one or more predicted future locations of each respective object. For example, the prediction system 180 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 180 can be indicative of the speed and/or acceleration at which the respective object is predicted to travel along its associated predicted motion trajectory. The predictions system 165 can output the prediction data 180 (e.g., indicative of one or more of the predicted motion trajectories) to the motion planning system 170.

The vehicle computing system 105 (e.g., the motion planning system 170) can determine a motion plan 185 for the vehicle 110 based at least in part on the perception data 175, the prediction data 180, and/or other data. A motion plan 185 can include vehicle actions (e.g., planned vehicle trajectories, speed(s), acceleration(s), other actions, etc.) with respect to one or more of the objects within the surrounding environment of the vehicle 110 as well as the objects' predicted movements. For instance, the motion planning system 170 can implement an optimization algorithm, model, etc. that considers cost data associated with a vehicle action as well as other objective functions (e.g., cost functions based on speed limits, traffic lights, etc.), if any, to determine optimized variables that make up the motion plan 185. The motion planning system 170 can determine that the vehicle 110 can perform a certain action (e.g., pass an object) without increasing the potential risk to the vehicle 110 and/or violating any traffic laws (e.g., speed limits, lane boundaries, signage, etc.). For instance, the motion planning system 170 can evaluate one or more of the predicted motion trajectories of one or more objects during its cost data analysis as it determines an optimized vehicle trajectory through the surrounding environment. The motion planning system 185 can generate cost data associated with such trajectories. In some implementations, one or more of the predicted motion trajectories may not ultimately change the motion of the vehicle 110 (e.g., due to an overriding factor such as a jaywalking pedestrian). In some implementations, the motion plan 185 may define the vehicle's motion such that the vehicle 110 avoids the object(s), reduces speed to give more leeway one or more of the object(s), proceeds cautiously, performs a stopping action, etc.

The motion planning system 170 can be configured to continuously update the vehicle's motion plan 185 and a corresponding planned vehicle motion trajectory. For example, in some implementations, the motion planning system 170 can generate new motion plan(s) 185 for the vehicle 110 (e.g., multiple times per second). Each new motion plan can describe motion of the vehicle 110 over the next planning period (e.g., next several seconds). Moreover, a new motion plan may include a new planned vehicle motion trajectory. Thus, in some implementations, the motion planning system 170 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 110.

The vehicle computing system 105 can cause the vehicle 110 to initiate a motion control in accordance with at least a portion of the motion plan 185. For instance, the motion plan 185 can be provided to the vehicle control system(s) 140 of the vehicle 110. The vehicle control system(s) 140 can be associated with a vehicle controller (e.g., including a vehicle interface) that is configured to implement the motion plan 185. The vehicle controller can, for example, translate the motion plan into instructions for the appropriate vehicle control component (e.g., acceleration control, brake control, steering control, etc.). By way of example, the vehicle controller can translate a determined motion plan 185 into instructions to adjust the steering of the vehicle 110 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 185 (e.g., by sending control signal(s), making the translated plan available, etc.). This can allow the vehicle 110 to autonomously travel within the vehicle's surrounding environment.

In some implementations, the vehicle 110 can include a human machine interface system 190. The human machine interface system 190 can be configured to allow interaction between a user (e.g., human), the vehicle 110 (e.g., the vehicle computing system 105), and/or a third party (e.g., an operator associated with the service provider). The human machine interface system 190 can include a variety of hardware and/or software that allows a user to input and/or receive information. For example, the human machine interface system 190 can include a user device (e.g., tablet, phone, laptop, gaming system, other user device, etc.) that includes one or more display devices (e.g., display screens, etc.). The human machine interface system 190 can implement, for example, a graphical user interface, direct manipulation interface, web-based user interface, touch user interface, attentive user interface, conversational and/or voice interfaces (e.g., via text messages, chatter robot), conversational interface agent, interactive voice response (IVR)

system, gesture interface, and/or other types of interfaces via the user devices. The human machine interface system 190 (e.g., the associated user device(s)) can include one or more input device(s) (e.g., touchscreens, keypad, touchpad, knobs, buttons, sliders, switches, mouse, gyroscope, microphone, other hardware interfaces) configured to receive user input. The human machine interface system 190 (e.g., the associated user device(s)) can also include one or more output device(s) (e.g., display devices, speakers, lights, etc.) to receive and output data associated with the interfaces (e.g., visual content, audio content, haptic content, etc.).

As described herein, the vehicle 110 can communicate with one or more remote computing systems that are remote from the vehicle 110. For instance, the vehicle computing system 105 can utilize the communication system 125 to communicate with the operations computing system 115. The vehicle computing system 105 can provide various types of data to the operations computing system 115, via the communications system 125. For example, the vehicle computing system 105 can provide sensor data 145, perception data 175, prediction data 180, data indicative of motion plans 185, other vehicle control data, requests for data (e.g., requests for a vehicle service assignment, request for content to be outputted via the human machine interface system, request for assistance, etc.), and/or other data. Additionally, or alternatively, the vehicle computing system 105 can provide vehicle state data, which can include data indicative of past, current, or future (planned): location (also referred to as position or pose); speed (also referred to as velocity); acceleration, heading; orientation; route of the vehicle; vehicle trajectory; objects detected within the vehicle's surrounding environment (e.g., the bounding shapes associated therewith); vehicle diagnostic data; other data for modeling vehicle state, etc. The vehicle computing system 105 can also obtain data from the operations computing system 115. This can include data in response to a request (e.g., a vehicle assignment, assistance control signals, etc.) and/or without a vehicle request (e.g., updated map data). To provide and/or obtain such data from remote computing systems, the vehicle computing system 105 can communicate with an entity infrastructure such as, for example, a telecommunications network system.

Figure 2:
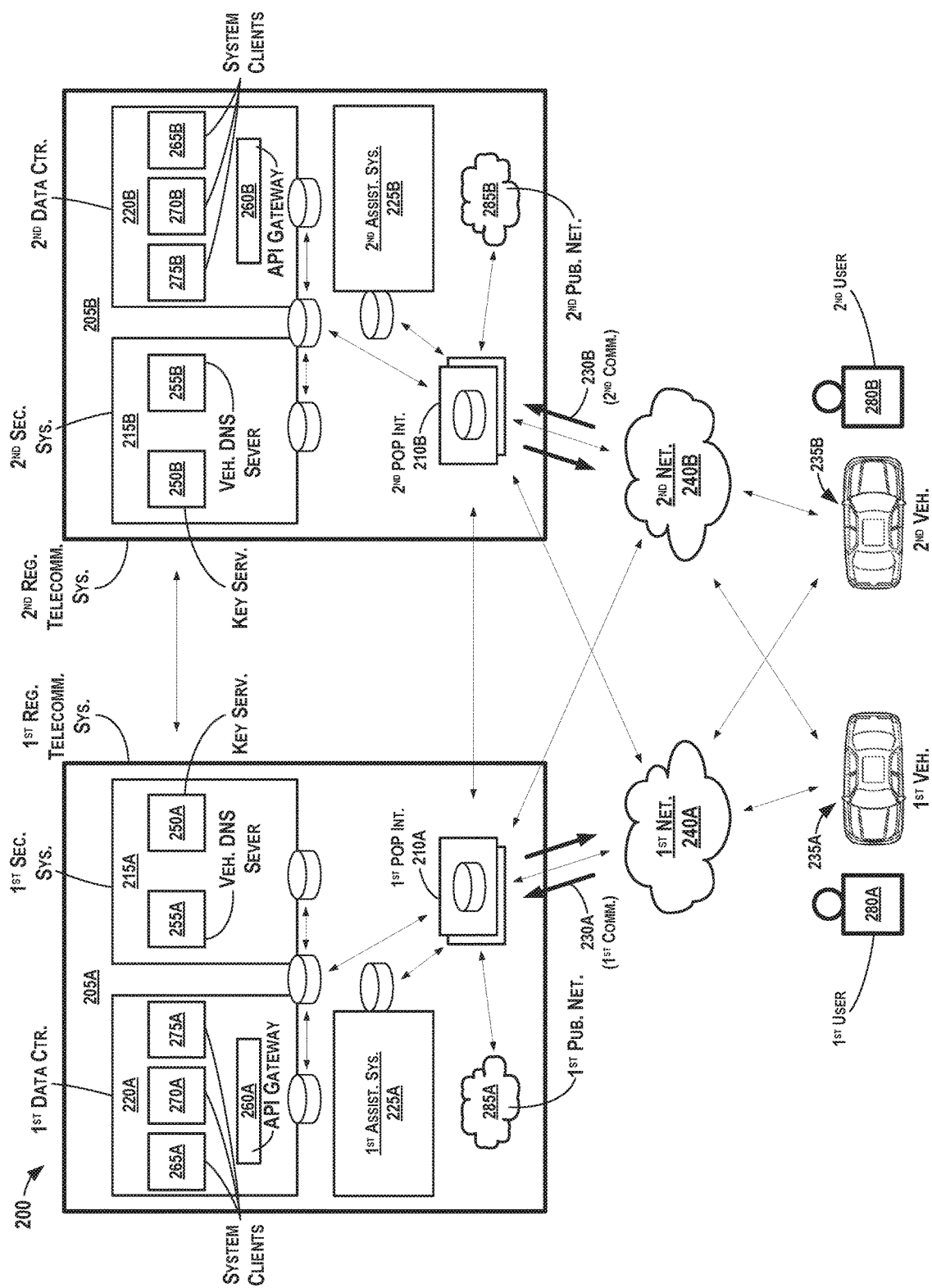
FIG. 2 depicts an example telecommunications network system according to example embodiments of the present disclosure.

FIG. 2 depicts an example telecommunications network system 200 according to example embodiments of the present disclosure. The telecommunications network system 200 can be a vehicle telecommunications network system (e.g., an autonomous vehicle telecommunications network system) that provides an improved infrastructure to facilitate communication between vehicle(s) (e.g., autonomous vehicle(s), etc.) and various computing systems that are remote from the vehicle(s). The telecommunications network system 200 can include one or more regional telecommunications systems 205A-B.

Each of the regional telecommunications systems can be associated with a different geographic region. By way of example, the telecommunications network system 200 can include a first regional telecommunications system 205A that is associated with the west coast of the United States and a second regional telecommunications system 205B that is associated with the east coast of the United States. Each regional telecommunications system 205A-B can be, implement, and/or otherwise include an operations computing system (e.g., an operations computing system 115). Such an operations computing system can be associated with the particular geographic region of that regional telecommunications system 205A-B.

In some implementations, the regional telecommunications systems of the telecommunications network can be implemented on a more granular level. For instance, a geographic region can include one or more zones (e.g., portions) within the geographic region. A first zone within that geographic region could be associated with a first telecommunications systems (e.g., 205A) and a second zone within that geographic region could be associated with a second telecommunications systems (e.g., 205B). In this way, each geographic region could have a one or more operations computing systems designated for that geographic region.

Each regional telecommunications system 205A-B can include a point-of-presence interface, a security system, and a data center system. For instance, the telecommunications network system 200 (e.g., a first regional telecommunication system 205A) can include a first point-of-presence interface 210A, a first security system 215A, and a first data center 220A. In some implementations, the telecommunications network system 200 (e.g., the first regional telecommunication system 205A) can include a first autonomous vehicle assistance system 225A. The first point-of-presence interface 210A, the first security system 215A, the first data center system 220A, and/or the first autonomous vehicle assistance system 225A can be associated with a first geographic region. Additionally, or alternatively, the telecommunications network system 200 (e.g., a second regional telecommunication system 205B) can include a second point-of-presence interface 210B, and a second security system 215B, and a second data center 220B. In some implementations, the telecommunications network system 200 (e.g., the second regional telecommunication system 205B) can include a second autonomous vehicle assistance system 225B. The second point-of-presence interface 210B, the second security system 215B, the second data center system 220B, and/or the second autonomous vehicle assistance system 225B can be associated with a second geographic region that is different from the first geographic region.

A point-of-presence interface 210A-B can be configured to route the communications associated with a vehicle. For instance, the first point-of-presence interface 210A can be configured to obtain a first communication 230A associated with a first vehicle 235A and to route the first communication 230A associated with the first vehicle 235A. The first vehicle 235A can be located within the first geographic region. Additionally, or alternatively, the second point-of-presence interface 210B can be configured to obtain a second communication 230B associated with a second vehicle 235B and to route the second communication 230B associated with the second vehicle 235B. The second vehicle 235B can be located within the second geographic region. The first and second vehicles 235A-B can be similar to the vehicle 104 described herein (e.g., autonomous vehicles). In some implementations, the vehicles 235A-B can communicate with one another.

While the examples provided herein are described with respect to communications being provided from a vehicle to the telecommunications network system 200, the systems and methods are similarly applicable to communications being provided to a vehicle.

A point-of-presence interface 210A-B can include various computing devices (e.g., servers, routers, switches, multiplexers, other network interface equipment, etc.) for routing communications. For example, a point-of-presence interface 210A-B can be a pass-through network that is simply configured for routing purposes. In some implementations, the point-of-presence interface 210A-B can be configured to perform other functions (e.g., ACL applications, network address translation, etc.). A point-of-presence interface 210A-B can obtain (e.g., directly, indirectly via other device/system proxy, etc.) communications from the vehicle(s) 235A-B via a plurality of different networks 240A-B. The networks 240A-B can include, for example, various wireless networks (e.g., LTE networks, etc.) of different carriers and/or other types of networks. In some implementations, each of the vehicles 235A-B can have two or more communication connections leading to the same point-of-presence interface 210A-B. For example, a first vehicle 235A can provide a plurality of communications 230A via a plurality of concurrent communication sessions over the two different networks 240A-B (e.g., some over a first network 240A and some over a second network 240B) to the first point-of-presence interface 210A. In some implementations, in the event that one of the networks fails with respect to a point-of-presence interface (e.g., the second network 240B fails with respect to the first point-of-presence interface 210A), the effect could be isolated. For example, the first vehicle 235 may still be able to provide a communication 230A to the first point-of-presence interface 210A (e.g., via the first network 240A) and another communication to the second point-of-presence interface 210B (e.g., via the second network 240B). This can provide more flexibility for transmissions across different networks.

A point-of-presence interface 210A-B can facilitate authentication by a respective security system 215A-B associated therewith, as well as route communications to a recipient computing system (e.g., a data center system 220A-B, autonomous vehicle assistance system 225A-B, etc.). The point-of-presence interface(s) 210A-B can be separate from the other computing systems in the telecommunications network system 200 (e.g., the systems of the respective regional system). For instance, the first point-of-presence interface 210A can be separate from the first security system 215A and the first data center system 220A. The first point-of-presence interface 210A can be separate from the first autonomous vehicle assistance system 225A. The second point-of-presence interface 210B can be separate from the second security system 215B and the second data center system 220B. The second point-of-presence interface 210B can be separate from the second autonomous vehicle assistance system 225B.

In some implementations, the first point-of-presence interface 210A can be physically separate from the first security system 215A, the first data center system 220A, and/or the first autonomous vehicle assistance system 225A. The second point-of-presence interface 210B can be physically separate from the second security system 215B, the second data center system 220B, and/or the second autonomous vehicle assistance system 225B. For example, the respective point-of-presence interface 210A-B can be implemented via different computing devices (e.g., different designated processors, etc.) and/or otherwise be separated from the hardware of the security system 215A-B, the data center system 220A-B, the autonomous vehicle assistance system 225A-B, etc. of its associated regional telecommunications system 205A-B.

In some implementations, the first point-of-presence interface 210A can be logically separate from the first security system 215A, the first data center system 220A, and/or the first autonomous vehicle assistance system 225A. The second point-of-presence interface 210B can be logically separate from the second security system 215B, the second data center system 220B, and/or the second autonomous vehicle assistance system 225B. For example, the point-of-presence interfaces 210A-B can be implemented via different firmware and/or software than (and/or otherwise be logically separated from) the respective security system 215A-B, data center system 220A-B, autonomous vehicle assistance system 225A-B, etc. As described herein, by separating the point-of-presence interface 210A-B (e.g., physically, logically, etc.), the point-of-presence interfaces 210A-B do not need to perform any security functions and/or store (at least not in the long term) any proprietary data (e.g., source code, proprietary vehicle data, etc.). Such functions and information can instead be kept more securely in the separate security systems 215A-B and/or data center systems 220A-B. As such, the telecommunications network system 200 (e.g., point-of-presence interfaces 210A-B) may not utilize internet protocol security (IPSEC), as the security systems 215A-B and/or data center systems 220A (e.g., via a vehicle API) provide more scalable and futureproof security solutions. Moreover, this can allow the computational resources of a point-of-presence interface 210A-B to be allocated to its routing functionality.

The point-of-presence interfaces 210A-B can facilitate the authentication of a vehicle 235A-B by the security systems 215A-B. As described herein, each regional telecommunications system 205A-B can include a security system 215A-B that is separate from the respective point-of-presence interface 210A-B. For example, the telecommunications network system 200 can include a first security system 215A configured to authenticate a first vehicle 235A via the first point-of-presence interface 210A. The first point-of-presence interface 210A can be separate from the first security system 215A. Additionally, or alternatively, the telecommunications network system 200 can include a second security system 215B configured to authenticate a second vehicle 235B via the second point-of-presence interface 210B. The second point-of-presence interface 210B can be separate from the second security system 215B.

A security system 215A-B can include various systems and devices for authenticating the vehicles 235A-B and/or other security functions. For instance, a security system 215A-B can include a key server 250A-B, a vehicle domain name system (DNS) server 255A-B (e.g., secure DNS server), and/or other computing device(s). The security system 215A-B can also be configured for other functions such as, for example, data encryption, proxy/load balancing, security termination, network time protocol, and/or other functions. A security system 215A-B can authenticate a vehicle 235A-B to allow it to communicate with the other systems of the telecommunications network system 200 (e.g., system clients of the operations computing system). By way of example, a unique identifier, token, etc. can be stored onboard a vehicle 235A-B and can be provided (e.g., via a point-of-presence interface 210A-B) to the security system 215A-B so that the security system 214A-B can identify that the vehicle 235A-B is part of an associated fleet and/or otherwise an authorized vehicle. As a result of a handshake process, the vehicle 235A-B can obtain (e.g., via a point-of-presence interface 210A-B) a key that can allow the vehicle 235A-B to be authenticated for calling a vehicle application programming interface (API) gateway 260A-B of the respective data center system 220A-B. The vehicle API gateway 260A-B and the vehicle 235A-B can undergo a handshake procedure to determine one or more temporary keys to be used for that particular API session. The API session can allow the vehicle 235A-B to send data to and receive data from a remote computing system such as, for example, a data center system 220A-B.

A data center system 220A-B can be configured to obtain communications associated with a vehicle 235A-B that is authenticated and/or provide data to a vehicle 235A-B. For instance, the telecommunications network system 200 can include a first data center system 220A configured to receive the first communication 230A associated with the first vehicle 235A and to provide data to the first vehicle 235A. As described herein, the first point-of-presence interface 210A can be separate from the first data center system 220A. Additionally, or alternatively, the telecommunications network system 200 can include a second data center system 220B configured to receive the second communication 230B associated with the second vehicle 235B and to provide data to the second vehicle 235B. The second point-of-presence interface 210B can be separate from the second data center system 220B.

Each data center system 220A-B can include a vehicle API gateway 260A-B which can allow a vehicle 235A-B to create API sessions for communication with the data center system 220A-B. An API gateway 260A-B can be a logically consolidated point of ingress and egress for communications from and/or to a vehicle 235A-B and the respective data center system 220A-B (e.g., communications associated with authenticated vehicles). Moreover, an API gateway 260A-B can be a logical construct that contains all vehicle and/or service facing interfaces. For example, the API gateway 260A-B can include a plurality of frontend interfaces. Each frontend interface can be associated with at least one system client 265A-B, 270A-B, and 275A-B. A system client can be the hardware and/or software implemented within a data center system 220A-B (e.g., of the entity) that is remote from the vehicle 235A-B and that provides a particular back-end service to a vehicle 235A-B. Such a service can include, for example, the gathering of vehicle state data, scheduling of vehicle service assignments, processing payment for the provision of vehicle services, etc. A frontend interface can be the interface (e.g., a normalized interface) that allows one application and/or system to provide data to and/or obtain data from another application and/or system. Each frontend interface can have one or more functions that are associated with the particular frontend interface. A communication provided to the API gateway 260A-B can call a function of a frontend interface.

By way of example, a vehicle 235A-B can provide a communication that requests data from a data center system 220A-B (e.g., via an API session). The communication can be authenticated and provided to the data center system 220A-B, as described herein. The data center system 220A-B can be configured to provide the vehicle 235A-B with a set of data in response. This can include, for example, map data (e.g., associated with an area in which the vehicle is and/or will be travelling), vehicle service data (e.g., data associated with a transportation service, delivery service, courier service, etc. to be provided by the vehicle), maintenance data (e.g., indicative of when and where the vehicle is to receive maintenance), data to be utilized by a human machine interface system 190 (e.g., data indicative of a user interface to be display via a display device, audio content to be outputted via speaker(s), etc.) and/or other information. In some implementations, a vehicle 235A-B may request such data from the data center system 220A-B on periodic, scheduled, as-needed, and/or other basis. In some implementations, the data center system 220A-B can provide data to the vehicle 235A-B without the vehicle 235A-B requesting such data (e.g., periodically providing updated map data 150, etc.). In some implementations, the vehicle 235A-B can upload data to the data center system 220A-B. For example, the data center system 220A-B can obtain sensor data 145, perception data 175, prediction data 180, data associated with a motion plan 185, and/or other data obtained (e.g., received, retrieved, acquired, created, generated, etc.) onboard a vehicle 235A-B. Such data can be stored in the data center system 220A-B and/or transmitted to another system for storage and/or analysis.

As described herein, the telecommunications network system 200 can also include an autonomous vehicle assistance system 225A-B. For instance, the telecommunications network system 200 (e.g., the first regional telecommunication system 205A) can include a first autonomous vehicle assistance system 225A configured to facilitate the provision of assistance to at least one of the first vehicle 235A or a first user 280A of the first vehicle 235A. As described herein, the first point-of-presence interface 210A can be separate from the first autonomous vehicle assistance system 225A. Additionally, or alternatively, the telecommunications network system 200 (e.g., the second regional telecommunication system 205B) can include a second autonomous vehicle assistance system 225B configured to facilitate the provision of assistance to at least one of the second vehicle 235B or a second user 280B of the second vehicle 235B.

In the event a vehicle and/or its user experiences an issue and requests assistance, the telecommunications network system 200 can facilitate the provision of such assistance. For example, the first communication 230A (provided by the first vehicle 235A) can include data indicative of a request for assistance from the autonomous vehicle assistance system 225A. The first point-of-presence interface 210A can be is further configured to route the first communication 230A associated with the first vehicle 235A to the first autonomous vehicle assistance system 225A. For instance, the first point-of-presence interface 210A can recognize this type of communication and can route the first communication 230A to the first autonomous vehicle assistance system 225A. Data traffic to (and/or from) the first autonomous vehicle assistance system 225A (and the human operators associated therewith) can be routed directly via the first point-of-presence interface 210A, as described herein, and/or through the first data center system 220A. In some implementations, the first vehicle 235A can first be authenticated by the first security system 215A and the first communication 230A (from the authenticated first vehicle 235A) can be provided to the autonomous vehicle assistance system 225A. In response to the communication requesting assistance, the autonomous vehicle assistance system 220A can communicate with the first vehicle 235A to address the issue faced by the vehicle.

By way of example, the first vehicle 235A may encounter a travel way that is unexpectedly blocked by an obstruction (e.g., due to a fallen tree, etc.). The first vehicle 235A may not have a high enough confidence level to navigate the obstruction (e.g., autonomously navigate the obstruction). Thus, the first vehicle 235A can provide (e.g., via its communication system 125) a first communication 230A requesting assistance from the autonomous vehicle assistance system 225A. The first point-of-presence interface 201A can facilitate the authentication of the first vehicle 235A by the security system 215A, as described herein. In some implementations, after authentication, the communication 230A can be provided to the autonomous vehicle assistance system 225A. The autonomous vehicle communication system 225A can communicate with the vehicle 235A (e.g., in at least near real-time accounting for processing and transmission delays) to allow a human operator (e.g., that is remote from the vehicle) to manually control the first vehicle 225A to traverse the obstruction. For example, control signal(s) can be provided to the first vehicle 235A to allow a human operator to control the motion of the first vehicle 235A from a location that is remote from the first vehicle 235A.

In some implementations, a user 280A-B of a vehicle 235A-B can initiate a communication to the autonomous vehicle assistance system 220A-B. By way of example, a first user 280A of the first vehicle 235A (e.g., a rider of the vehicle for a transportation service) may discover an issue with the first vehicle 235A (e.g., broken equipment in the vehicle cabin, etc.) and/or the first user 280A may experience a problem (e.g., a medical issue, etc.). The first user 280A can provide user input to a human-machine interface (e.g., tablet, etc.) located within the first vehicle 235A to request assistance from the autonomous vehicle assistance system 225A. For example, the first user 280A can provide user input to a user interface displayed via a display device of a user device. The user input can select a user interface element that causes the user device (and/or the communication system of the vehicle) to provide a communication to the first point-of-presence interface 210A. The communication can be indicative of the first user's request for assistance. In response, the first point-of-presence interface 210A can route the communication to the first autonomous vehicle assistance system 225A, as described herein. To help address the issue, the autonomous vehicle assistance system 225A can provide a set of data to the user device and/or to the vehicle's computing system, which can provide the set of data to the user device. For example, a human operator associated with the autonomous vehicle assistance system 225A can participate in a video conference with the first user 280A of the vehicle 235A via the user device. This can allow the human operator to comfort the first user 280A and work to address the issue discovered by and/or experienced by the first user 280A.

In some implementations, the autonomous vehicle assistance system 220A-B can be configured to proactively monitor and/or check the status of a vehicle 235A-B and/or its user 280A-B. For example, the autonomous vehicle assistance system 225A can provide data to the first vehicle 235A requesting the status of certain vehicle equipment (e.g., the current tire pressure, etc.). In response, the first vehicle 235A can provide, via the telecommunications network system 300, a communication to the autonomous vehicle assistance system 225A that indicates the equipment's status (e.g., the tire pressure of the vehicle's tires). In another example, the autonomous vehicle assistance system 225A can provide data to a human-machine interface (e.g., an onboard tablet, etc.) that asks a first user 280A of the first vehicle 235A whether the user 280A is comfortable (e.g., warm enough, cool enough, etc.). The user 280A can provide user input (e.g., via a user interface displayed on a display device of the human-machine interface, a microphone, etc.) indicating the user's comfort status and a communication indicative of such user input can be provided to the autonomous vehicle assistance system 225A (via the telecommunications network system 200).

In some implementations, the telecommunications network system 200 can provide a vehicle 235A-B with access to a public network 285A-B, such as a public internet network. For example, the first point-of-presence interface 210A can be configured to allow the first vehicle 235A to access a first public network 285A (e.g., a public internet network). Additionally, or alternatively, the second point-of-presence interface 210B can be configured to allow the second vehicle 235B to access a second public network 285B (e.g., a public internet network). Connectivity from a vehicle 235A-B to a public network 285A-B can either be direct (e.g., routed via a point-of-presence interface 210A-B) and/or controlled by looping public network traffic through vehicle API administered networks within the respective data center systems 220A-B. Use of a public network 285A-B can allow a user 280A-B of a vehicle 235A-B to utilize a variety of third party services. For instance, a human-machine interface system (e.g., tablet, gaming system, etc.) onboard a vehicle 235A-B can allow a user 280A-B to utilize various software applications (e.g., while riding in the vehicle for a transportation service). The software applications can utilize a public network 285A-B to provide the various third party services to the user 280A-B. For example, the human-machine interface system may allow a user 280A-B to utilize a video streaming service. In the event that a software application associated with the video streaming service is launched (e.g., on a user device upon user input selection), the vehicle 235A-B can send a communication to a point-of-presence interface 210A-B to allow the human-machine interface system to access a public internet network 285A-B so that the user 280A-B can stream visual content (e.g., movies, TV shows, etc.) while in the vehicle 235A-B. In another example, when a gaming software application is launched, the human-machine interface system can access a public internet network 285A-B via a point-of-presence interface 210A-B to allow a user 280A-B to play a game via a public internet network 285A-B (e.g., with users of other vehicles).

In some implementations, the vehicles 235A-B may utilize one or more subscriber identity modules (SIMs) to backhaul data traffic to a point-of-presence interface 210A-B that is directed a private network and/or for data traffic to public network 285A-B. For example, a vehicle 235A-B can include one or more SIMs (e.g., a private SIM) which backhaul traffic into a point-of-presence interface 210A-B, and one or more other SIMs (e.g., a public internet SIM) which is for data traffic to be provided directly onto a public network 285A-B via the network(s) 240A-B.

The point-of-presence interface(s) 210A-B can also provide a failover process for the telecommunications network system 200. This can ensure that, for example, the data utilized for vehicle operation (e.g., map data), data generated by a vehicle (e.g., sensor data), as well other communications (e.g., distress calls) are still appropriately addressed in the event of a system failure.

Figure 3A:
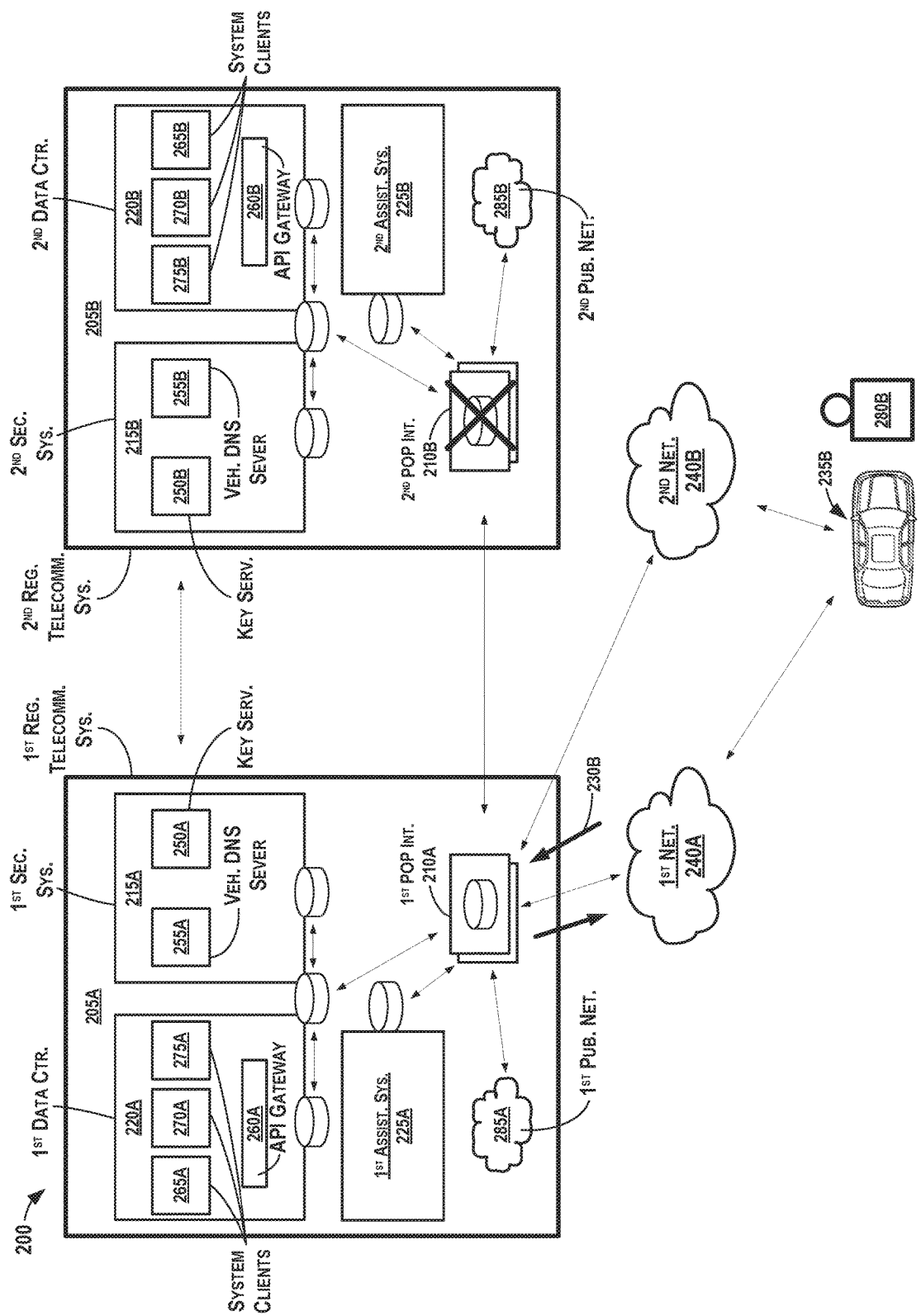
FIGS. 3A-B depict example telecommunications network system failover procedures according to example embodiments of the present disclosure.
Figure 3B:
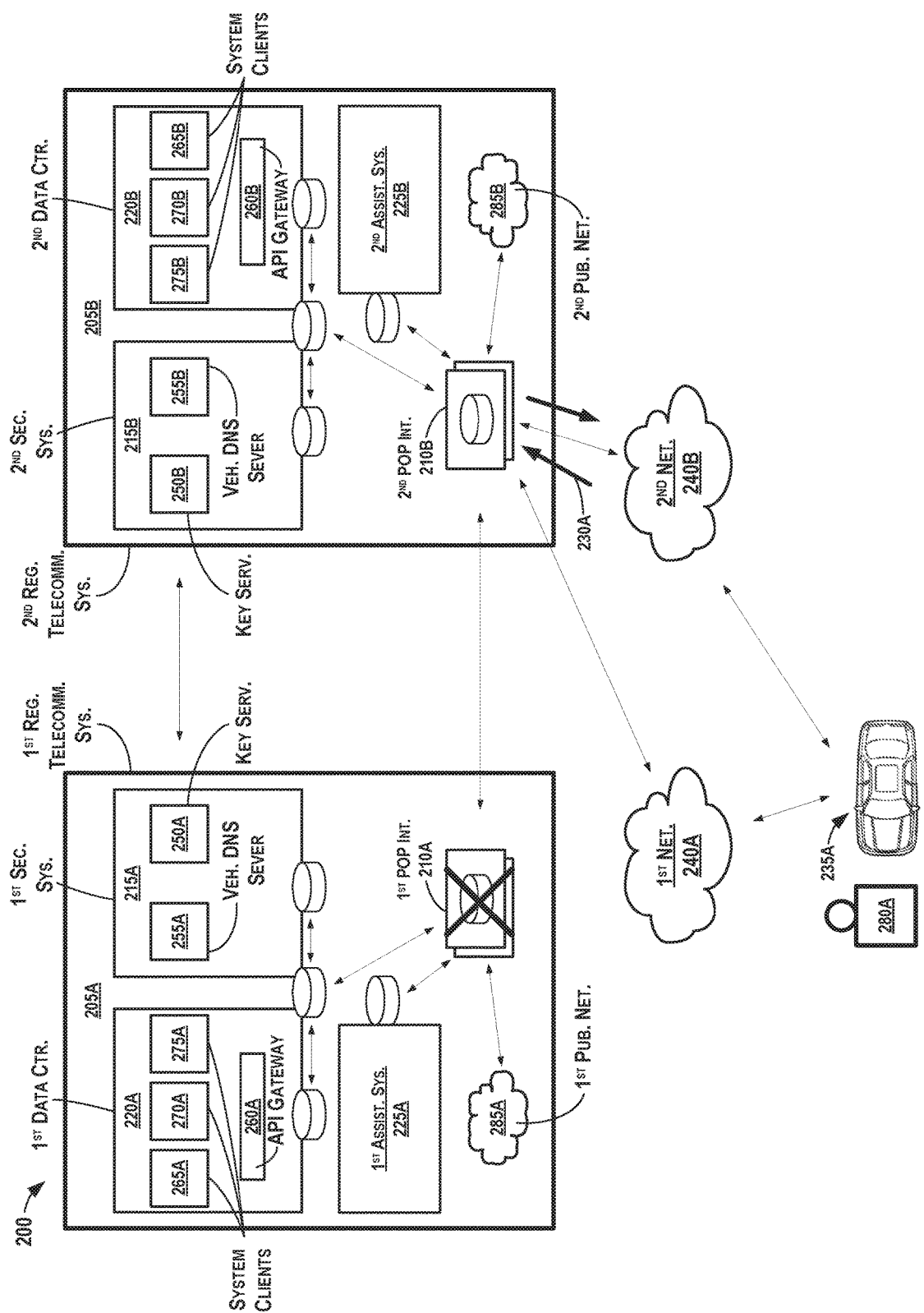

For example, FIGS. 3A and 3B depict example failover procedures for the telecommunications network system 200. As described herein, the telecommunications network system 200 can include multiple point-of-presence interfaces 210A-B (e.g., each associated with a particular geographic region). By way of example, the telecommunications network system 200 can include a first point-of-presence interface 210A associated with a first geographic region and a second point-of-presence interface 210B associated with a second geographic region. The first point-of-presence interface 210A can be configured to obtain one or more first communications 230A from one or more first vehicles 235A located within the first geographic region. The second point-of-presence interface 210B can be configured to obtain one or more second communications 230B from one or more second vehicles 235B located within the second geographic region (e.g., to help decrease latency caused by long distance data traffic). With reference to FIG. 3A, the first point-of-presence interface 210A can be further configured to obtain the one or more second communications 230B associated with the second vehicle(s) 235B when the second point-ofpresence interface 210B is unavailable. A point-of-presence interface may be considered unavailable when it experiences a hardware/software failure that effects communicability, is unreachable (e.g., completely unreachable), degraded due to a break in a SLA, experiencing other errors and/or affected by other failures of the telecommunications network system 200, and/or experiencing other problems. By way of example, in the event that the second point-of-presence interface 210B is unavailable, the networks 240A-B can provide the second communication(s) 230B to the first point-of-presence interface 210A. The first point-of-presence interface 210A can route the second communication(s) 230B (e.g., from vehicles within the second geographic region) to the systems of the first regional telecommunications system 205A in a manner similar to that described herein with respect to the first communications 230A.

Additionally, or alternatively, with reference to FIG. 3B, the second point-of-presence interface 210B can be further configured to obtain the first communication(s) 230A associated with the first vehicle(s) 235A when the first point-of-presence interface 210A is unavailable. By way of example, in the event that first point-of-presence interface 210A is unavailable (e.g., due to hardware/software failure, unreachable due to communication error, etc.), the networks 240A-B can provide the first communication(s) 230A to the second point-of-presence interface 210B. The second point-of-presence interface 210B can route the first communication(s) 230A (e.g., from vehicles within the first geographic region) to the systems of the second regional telecommunications system 205B in a manner similar to that described herein with respect to the second communications 230B. As such, the redundant regional telecommunications system can provide secure failover protection in the event of a problem with one of the regional telecommunications systems.

In some implementations, the first failover option for a failover procedure can be the one or more other telecommunications systems associated with that geographic region (e.g., the other telecommunications system(s) associated with the other zones of that particular geographic region). For example, in the event of a failure of a telecommunications system associated with a first zone of a geographic region, the traffic from vehicles within that failed zone can be routed to the point-of-presence interface of another telecommunications system associated with a second zone of that particular geographic region. Thus, in the event of a system failure, the data traffic can still be addressed by a system associated with that geographic region (e.g., a closest responsive operations computing system).

Figure 4:
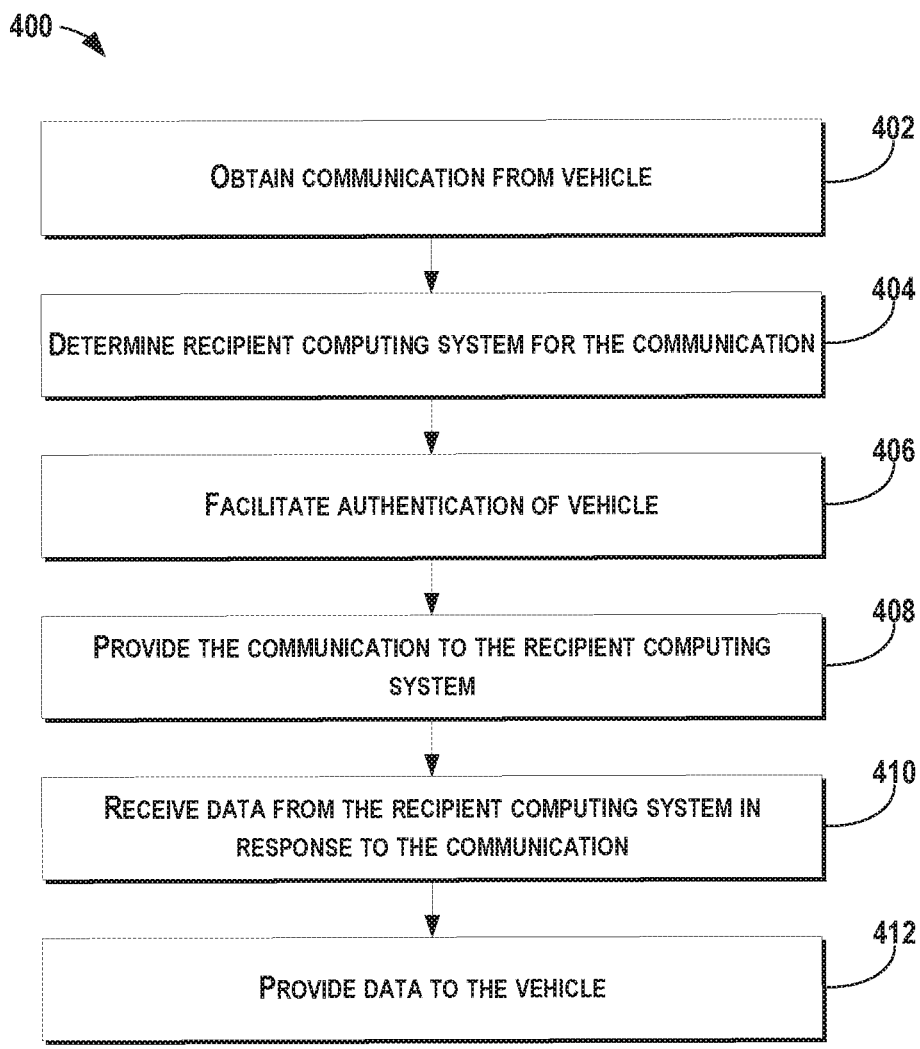
FIG. 4 depicts a flow diagram of a method for facilitating communication with autonomous vehicles.

FIG. 4 depicts a flow diagram of an example method 400 for facilitating communication with vehicles (e.g., autonomous vehicles) according to example embodiments of the present disclosure. One or more portion(s) of the method 400 can be implemented by a computing system that includes one or more computing devices such as, for example, one or more of the point-of-presence interfaces 210A-B. Each respective portion of the method 400 can be performed by any (or any combination) of a computing system. Moreover, one or more portion(s) of the method 400 can be implemented as an algorithm on the hardware components of the device(s) described herein (e.g., as in FIGS. 1 and 5), for example, to facilitate communication between a vehicle and a remote computing system. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (402), the method 400 can include obtaining a communication associated with a vehicle. For instance, a computing system such as a point-of-presence interface 210A-B can obtain (e.g., directly and/or indirectly from via other computing device(s)) a communication 230A-B associated with a vehicle 235A-B (e.g., an autonomous vehicle). In some implementations, the communication 230A-B can be generated by the vehicle's computing system in response to a request (e.g., from a system client). In some implementations, the communication 230A-B can be generated by the vehicle's computing system without such a request. The communication 230A-B can include vehicle state data, sensor data 145, perception data 175, prediction data 180, data indicative of motion plan(s) 185, a request for assistance and/or other data associated with the vehicle 235A-B.

In some implementations, the point-of-presence interface 210A-B can obtain a communication 230A-B associated with a vehicle 235A-B within the same geographic region that is associated with the point-of-presence interface 210A-B.

In some implementations, the point-of-presence interface 210A-B can obtain a communication 230A-B associated with a vehicle 235A-B that is within a different geographic region than the geographic region associated with the point-of-presence interface 210A-B (e.g., in the event of a failover procedure). For example, the recipient point-of-presence interface can be a first point-of-presence interface 210A associated with a first geographic region. The vehicle that provided the communication can be located in a second geographic region that is different from the first geographic region. A second point-of-presence interface 210B associated with the second geographic region may be unavailable. Accordingly, the first point-of-presence interface 210A can obtain a communication from the vehicle located in the second geographic region based at least in part on the second point-of-presence interface 210B being unavailable, as described herein.

At (404), the method 400 can include determining a recipient computing system for the communication associated with the vehicle. For instance, the computing system (e.g., the point-of-presence interface 210A-B) can determine a recipient computing system based at least in part on the communication from the vehicle 235A-B. The recipient computing system can be separate from the computing system (e.g., point-of presence interface 210A-B). For example, the computing system (e.g., the point-of-presence interface 210A-B) can process the contents of the communication and the metadata (e.g., a tag, etc.) associated therewith to determine which recipient computing system should receive the communication. The recipient computing system can include, for example, a data center system 220A-B, an autonomous vehicle assistance system 225A, and/or another computing system.

At (406), the method 400 can include facilitating the authentication of a vehicle. For instance, the computing system (e.g., the point-of-presence interface 210A-B) can facilitate an authentication of the vehicle 235A-B by a security system 215A-B. For example, the point-of-presence interface 210A-B can act as an interface for the vehicle 235A-B and/or the security system 215A-B to transfer information (e.g., keys, tokens, etc.) that can be utilized to authenticate the vehicle 235A-B such that the vehicle 235A-B can communicate with one or more other systems (e.g., the recipient computing systems). As described herein, the computing system (e.g., the point-of-presence interface 210A-B) can be separate from the security system 215A-B.

At (408), the method 400 can providing the communication to the recipient computing system. For instance, the computing system (e.g., the point-of-presence interface) can provide the communication 230A-B associated with a vehicle 235A-B that is authenticated to the recipient computing system (e.g., data center system 215A, autonomous vehicle assistance system 225A-B). For example, the point-of-presence interface 210A-B can route a communication 230A-B requesting a vehicle service assignment to a data center system 220A-B. In another example, the point-of-presence interface 210A-B can route a communication 230A-B requesting vehicle/user assistance to an autonomous vehicle assistance system 225A-B.

At (410), the method 400 can include obtaining data from the recipient computing system in response to the communication. For instance, the computing system (e.g., the point-of-presence interface 210A-B) can obtain, from the recipient computing system, data in response to the communication 230A-B. For example, in response to a communication 230A-B requesting a vehicle service assignment, the computing system (e.g., the point-of-presence interface 210A-B) can obtain (e.g., from the data center system 220A-B, a vehicle service system client, etc.) a set of data indicative of a vehicle service assignment (e.g., indicative of a location at which to pick-up a user, to drop-off a user, a vehicle route, etc.). In another example, in response to a communication 230A-B requesting vehicle/user assistance, the computing system (e.g., the point-of-presence interface 210A-B) can obtain (e.g., from the autonomous vehicle assistance system 225A-B) a set of data indicative of a one or more control signals to control the motion of the vehicle. The computing system (e.g., the point-of-presence interface 210A-B) can provide the data to the vehicle 235A-B, at (414).

Figure 5:
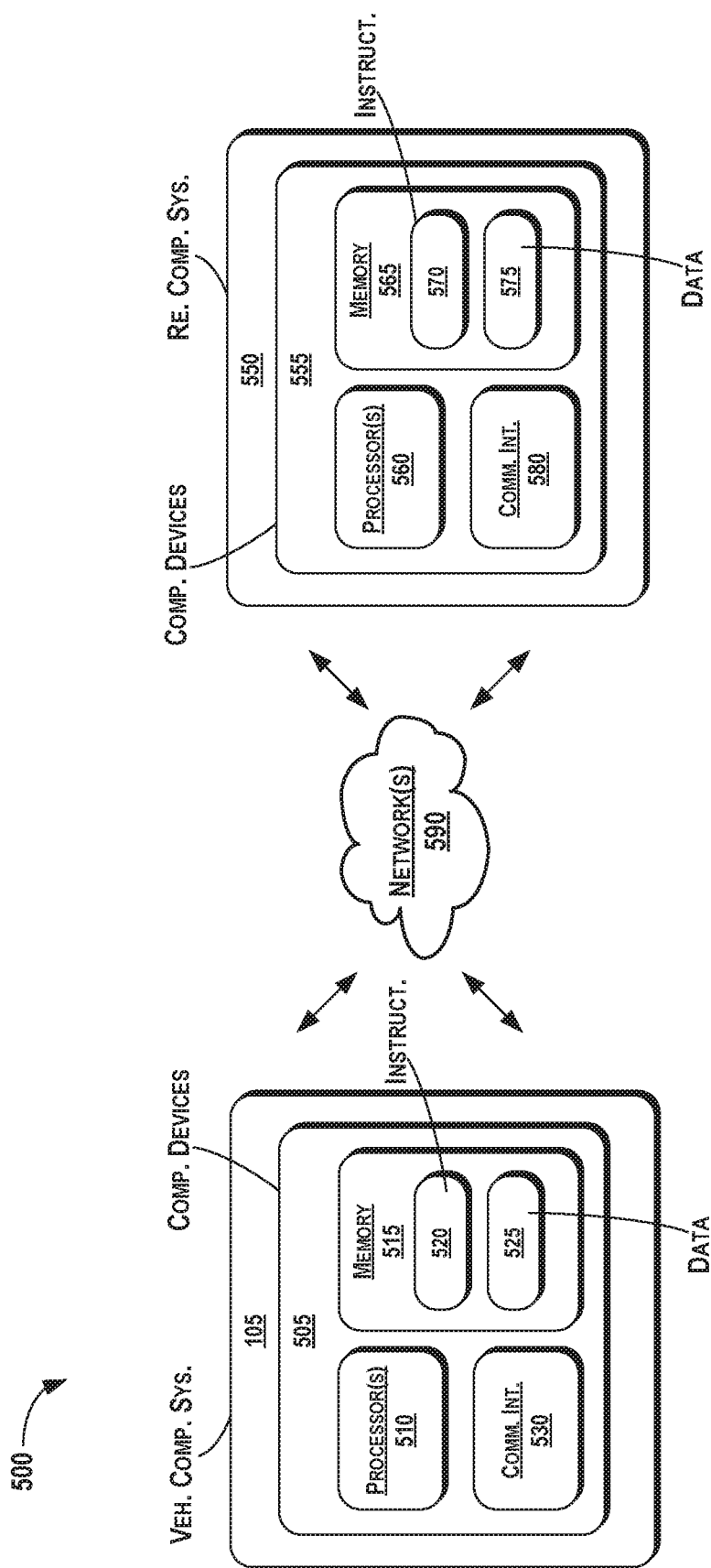
FIG. 5 depicts example system components according to example embodiments of the present disclosure.

FIG. 5 depicts an example system 500 according to example embodiments of the present disclosure. The example system 500 illustrated in FIG. 5 is provided as an example only. The components, systems, connections, and/or other aspects illustrated in FIG. 5 are optional and are provided as examples of what is possible, but not required, to implement the present disclosure. The example system 500 can include the vehicle computing system 105 of a vehicle (e.g., 110, 235A-B, etc.) and a remote system 550 that can be communicatively coupled to one another over one or more network(s) 590. The remote system 550 can correspond to the telecommunications network system 200 such as, for example, a regional telecommunications system 205A-B (e.g., implementing an operations computing system 106).

The computing device(s) 505 of the vehicle computing system 105 can include processor(s) 510 and a memory 515. The one or more processors 510 can be any suitable processing device (e.g., a processor core, a microprocessor, an ASIC, a FPGA, a controller, a microcontroller, etc.) and can be one processor or a plurality of processors that are operatively connected. The memory 515 can include one or more non-transitory computer-readable storage media, such as RAM, ROM, EEPROM, EPROM, one or more memory devices, flash memory devices, data registrar, etc., and combinations thereof.

The memory 515 can store information that can be accessed by the one or more processors 510. For instance, the memory 515 (e.g., one or more non-transitory computer-readable storage mediums, memory devices) on-board the vehicle can include computer-readable instructions 520 that can be executed by the one or more processors 510. The instructions 520 can be software written in any suitable programming language or can be implemented in hardware. Additionally, or alternatively, the instructions 520 can be executed in logically and/or virtually separate threads on processor(s) 510.

For example, the memory 515 on-board the vehicle can store instructions 520 that when executed by the one or more processors 510 on-board the vehicle cause the one or more processors 510 (the vehicle computing system 105) to perform operations such as any of the operations and functions of the vehicle computing system 105, the operations and functions for generating, providing, and obtaining communications to and/or from a vehicle, any of the operations and functions for which the vehicle computing system 105 is configured, and/or any other operations and functions of the vehicle computing system 105, as described herein.

The memory 515 can store data 525 that can be obtained (e.g., received, retrieved accessed, written, manipulated, created, stored, etc.). The data 525 can include, for instance, sensor data, map data, vehicle state data, perception data, prediction data, motion planning data, data associated with a human-machine interface, and/or other data/information such as that described herein. In some implementations, the computing device(s) 505 can obtain data from one or more memories that are remote from the vehicle.

The computing device(s) 505 can also include a communication interface 530 used to communicate with one or more other system(s) on-board a vehicle and/or a remote computing device that is remote from the vehicle (e.g., of the remote system 550). The communication interface 530 can include any circuits, components, software, etc. for communicating via one or more networks (e.g., network(s) 590). The communication interface 530 can include, for example, one or more of a communications controller, receiver, transceiver, transmitter, port, conductors, software and/or hardware for communicating data.

The remote system 550 can include one or more computing device(s) 555 that are remote from the vehicle computing system 105. The computing device(s) 555 can include one or more processors 560 and a memory 565. The one or more processors 560 can be any suitable processing device (e.g., a processor core, a microprocessor, an ASIC, a FPGA, a controller, a microcontroller, etc.) and can be one processor or a plurality of processors that are operatively connected. The memory 565 can include one or more tangible, non-transitory computer-readable storage media, such as RAM, ROM, EEPROM, EPROM, one or more memory devices, flash memory devices, data registrar, etc., and combinations thereof.

The memory 565 can store information that can be accessed by the one or more processors 560. For instance, the memory 556 (e.g., one or more tangible, non-transitory computer-readable storage media, one or more memory devices, etc.) can include computer-readable instructions 570 that can be executed by the one or more processors 560. The instructions 570 can be software written in any suitable programming language or can be implemented in hardware. Additionally, or alternatively, the instructions 570 can be executed in logically and/or virtually separate threads on processor(s) 560.

For example, the memory 565 can store instructions 570 that when executed by the one or more processors 560 cause the one or more processors 560 to perform operations such as any of the operations and functions of the telecommunications network system 200, any of the operations and functions of a regional telecommunications system 205A-B, any of the operations and functions of an operations computing system 106, any of the operations and functions of a point-of-presence interface 210A-B, a security system 215A, data center system 220A, autonomous vehicle assistance system 224A-B, or for which any of these systems are configured, as described herein, and/or any other operations and functions described herein. As described herein, any operations and functions of a point-of-presence interface can be logically and/or physically separated from any operations and functions of the other systems (e.g., data center systems, security systems, autonomous vehicle assistance systems, etc.).

The memory 565 can store data 570 that can be obtained. The data 570 can include, for instance, communications associated with/provided by vehicles, data to be provided to vehicles, data associated with vehicle authentication, application programming interface data, and/or other data/information such as that described herein. In some implementations, the computing device(s) 555 can obtain data from one or more memories that are remote from the system 550 and/or are onboard a vehicle.

The computing device(s) 555 can also include a communication interface 580 used to communicate with one or more system(s) onboard a vehicle and/or another computing device that is remote from the system 550. The communication interface 580 can include any circuits, components, software, etc. for communicating via one or more networks (e.g., network(s) 590). The communication interface 580 can include, for example, one or more of a communications controller, receiver, transceiver, transmitter, port, conductors, software and/or hardware for communicating data.

The network(s) 590 can be any type of network or combination of networks that allows for communication between devices. The network(s) 590 can correspond to the network(s) 240A-B described herein. In some embodiments, the network(s) 590 can include one or more of a local area network, wide area network, the Internet, secure network, cellular network, mesh network, peer-to-peer communication link and/or some combination thereof and can include any number of wired or wireless links. Communication over the network(s) 590 can be accomplished, for instance, via a communication interface using any type of protocol, protection scheme, encoding, format, packaging, etc.

Computing tasks discussed herein as being performed at computing device(s) at the vehicle can instead be performed remote from the vehicle (e.g., via the telecommunications network system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A vehicle telecommunications network system comprising:
   a first point-of-presence interface configured to obtain a first communication associated with a first vehicle and to route the first communication, wherein the first point-of-presence interface is remote from the first vehicle;
   a first security system configured to authenticate the first vehicle, wherein the first security system is remote from the first vehicle;
   a first data center system that is remote from the first vehicle, the first data center system configured to receive the first communication associated with the first vehicle that is authenticated and to provide data to the first vehicle;
   wherein the first point-of-presence interface, the first security system, and the first data center system are associated with a first geographic region;
   a second point-of-presence interface configured to obtain a second communication associated with a second vehicle and to route the second communication, wherein the second point-of-presence interface is remote from the second vehicle and the first vehicle;
   a second security system configured to authenticate the second vehicle, wherein the second security system is remote from the second vehicle and the first vehicle; and
   a second data center system that is remote from the first vehicle and the second vehicle, the second data center system configured to receive the second communication associated with the second vehicle that is authenticated and to provide data to the second vehicle, wherein the first point-of-presence interface, the first security system, and the first data center are remote from the second vehicle; and
   wherein the second point-of-presence interface, the second security system, and the second data center system are associated with a second geographic region that is different from the first geographic region, wherein the first point-of-presence interface is further configured to obtain the second communication associated with the second vehicle when the second point-of-presence interface is unavailable.

2. The vehicle telecommunications network system of claim 1, wherein the first point-of-presence interface is separate from the first security system and the first data center system, and wherein the second point-of-presence interface is separate from the second security system and the second data center system.

3. The vehicle telecommunications network system of claim 1, wherein the first vehicle is located within the first geographic region and wherein the second vehicle is located within the second geographic region.

4. The vehicle telecommunications network system of claim 1, wherein the second point-of-presence interface is further configured to obtain the first communication associated with the first vehicle when the first point-of-presence interface is unavailable.

5. The vehicle telecommunications network system of claim 1, further comprising:
   a first vehicle assistance system configured to facilitate a provision of assistance to at least one of the first vehicle or a first user of the first vehicle; and a second vehicle assistance system configured to facilitate a provision of assistance to at least one of the second vehicle or a second user of the second vehicle.

6. A vehicle telecommunications network system comprising:
- a first point-of-presence interface configured to obtain a first communication associated with a first vehicle and to route the first communication, wherein the first point-of-presence interface is remote from the first vehicle;
- a first security system configured to authenticate the first vehicle, wherein the first point-of-presence interface is separate from the first security system, wherein the first security system is remote from the first vehicle;
- a first data center system that is remote from the first vehicle, the first data center system configured to receive the first communication associated with the first vehicle that is authenticated and to provide data to the first vehicle, wherein the first point-of-presence interface is separate from the first data center system;
- wherein the first point-of-presence interface, the first security system, and the first data center system are associated with a first geographic region;
- a second point-of-presence interface, wherein the second point-of-presence interface is configured to obtain a second communication associated with a second vehicle and to route the second communication associated with the second vehicle, wherein the second point-of-presence interface is remote from the second vehicle and the first vehicle;
- a second security system configured to authenticate the second vehicle, wherein the second point-of-presence interface is separate from the second security system, wherein the second security system is remote from the second vehicle and the first vehicle; and
- a second data center system that is remote from the first vehicle and the second vehicle, the second data center system configured to receive the second communication associated with the second autonomous vehicle that is authenticated and to provide data to the second autonomous vehicle, wherein the second point-of-presence interface is separate from the second data center system, wherein the first point-of-presence interface, the first security system, and the first data center are remote from the second vehicle;
- wherein the second point-of-presence interface, the second security system, and the second data center system are associated with a second geographic region that is different from the first geographic region, wherein the first point-of-presence interface is configured to obtain the second communication associated with the second vehicle when the second point-of-presence interface associated with the second geographic region is unavailable and the second point-of-presence interface is further configured to obtain the first communication associated with the first vehicle when the first point-of-presence interface is unavailable.

7. The vehicle telecommunications network system of claim 6, wherein the first vehicle is located within the first geographic region, and wherein the second vehicle is located within the second geographic region.

8. The vehicle telecommunications network system of claim 6, wherein the first point-of-presence interface is further configured to route the first communication associated with the first vehicle to a vehicle assistance system.

9. The vehicle telecommunications network system of claim 6, wherein the first point-of-presence interface is configured to allow the first vehicle to access a public internet network.

10. The vehicle telecommunications network system of claim 6, wherein the first point-of-presence interface is physically separate from the first security system and the first data center system.

11. The vehicle telecommunications network system of claim 6, wherein the first point-of-presence interface is logically separate from the first security system and the first data center system.

12. The vehicle telecommunications network system of claim 6, wherein the vehicle telecommunications network system does not utilize internet protocol security.

* * * * *